(12) United States Patent
Higashiuchi et al.

(10) Patent No.: US 11,015,020 B2
(45) Date of Patent: May 25, 2021

(54) EPOXY RESIN, EPOXY RESIN COMPOSITION, EPOXY RESIN CURED PRODUCT AND COMPOSITE MATERIAL

(71) Applicant: Showa Denko Materials Co., Ltd., Tokyo (JP)

(72) Inventors: Tomoko Higashiuchi, Tokyo (JP); Naoki Maruyama, Tokyo (JP); Yuka Yoshida, Tokyo (JP); Kazumasa Fukuda, Tokyo (JP); Yoshitaka Takezawa, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/341,173

(22) PCT Filed: Oct. 14, 2016

(86) PCT No.: PCT/JP2016/080630
§ 371 (c)(1),
(2) Date: Apr. 11, 2019

(87) PCT Pub. No.: WO2018/070052
PCT Pub. Date: Apr. 19, 2018

(65) Prior Publication Data
US 2020/0199287 A1    Jun. 25, 2020

(51) Int. Cl.
| | | |
|---|---|---|
| *C08G 59/24* | (2006.01) | |
| *C08G 59/22* | (2006.01) | |
| *C08L 63/00* | (2006.01) | |
| *C08G 59/20* | (2006.01) | |

(52) U.S. Cl.
CPC .......... *C08G 59/245* (2013.01); *C08G 59/20* (2013.01); *C08G 59/226* (2013.01); *C08G 59/24* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 10,597,485 | B2 * | 3/2020 | Tanaka .................. | C08G 59/066 |
| 10,662,279 | B2 * | 5/2020 | Yoshida .................... | C08K 3/28 |
| 2003/0232964 | A1 * | 12/2003 | Akatsuka ............... | C08G 59/02 |
| | | | | 528/403 |
| 2012/0149807 | A1 * | 6/2012 | Asaumi .................... | C07C 67/31 |
| | | | | 523/457 |
| 2019/0284332 | A1 * | 9/2019 | Maruyama ............. | C08G 59/24 |
| 2019/0338068 | A1 * | 11/2019 | Maruyama ............. | C08G 59/24 |
| 2020/0002464 | A1 * | 1/2020 | Yoshida et al. .......... | C08J 5/042 |

FOREIGN PATENT DOCUMENTS

| | | |
|---|---|---|
| JP | 2013-227451 A | 11/2013 |
| WO | WO-2016/104772 A1 | 6/2016 |

\* cited by examiner

*Primary Examiner* — Michael J Feely
(74) *Attorney, Agent, or Firm* — Faegre Drinker Biddle & Reath LLP

(57) ABSTRACT

An epoxy resin, comprising an epoxy compound, the epoxy compound comprising two or more structures represented by the following Formula (I) and at least one divalent biphenyl group:

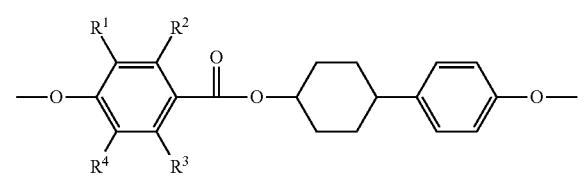

(I)

wherein, in Formula (I), each of $R^1$ to $R^4$ independently represents a hydrogen atom or an alkyl group having from 1 to 3 carbon atoms.

8 Claims, No Drawings

EPOXY RESIN, EPOXY RESIN COMPOSITION, EPOXY RESIN CURED PRODUCT AND COMPOSITE MATERIAL

TECHNICAL FIELD

The invention relates to an epoxy resin, an epoxy resin composition, an epoxy resin cured product, and a composite material.

BACKGROUND ART

Epoxy resin is used in various applications for its excellent thermal resistance. In view of a trend of increasing the use temperature of a power device, improvement in thermal conductivity of epoxy resin has been studied.

An epoxy resin including an epoxy compound having a mesogenic structure in its molecule (hereinafter, also referred to as a mesogen-containing epoxy resin) is known to exhibit excellent thermal conductivity. However, since a mesogen-containing epoxy resin generally has a higher viscosity than other epoxy resins, fluidity may not be sufficient achieved during the processing.

In this regard, addition of a solvent to reduce viscosity may be a possible way to improve the fluidity of a mesogen-containing epoxy resin. Further, as a mesogen-containing epoxy resin having excellent fluidity and thermal conductivity, an epoxy resin having a specific molecular size, obtained by reacting an epoxy monomer having a mesogenic structure with a divalent phenol compound, has been proposed (see, for example, Patent Document 1).

PRIOR ART DOCUMENTS

Patent Document

[Patent Document 1] International Publication No. WO 2016-104772

SUMMARY OF THE INVENTION

Problems to be Solved by the Invention

In a method of adding a solvent to a mesogen-containing epoxy resin, formation of voids due to the solvent may occur during curing, and affect the product quality. The mesogen-containing epoxy resin obtained by the method described in Patent Document 1 achieves a lowered softening point, but is still high in viscosity and yet to be improved in terms of handleablitiy.

In view of the above, the invention aims to provide an epoxy resin and an epoxy resin composition having excellent handleability. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound, the epoxy compound comprising two or more structures represented by the following Formula (I) and at least one divalent biphenyl group:

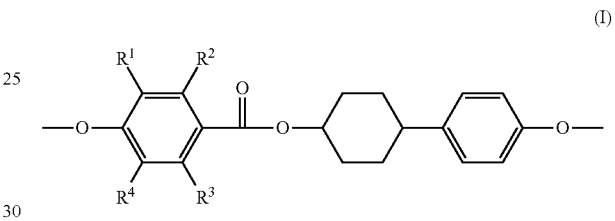

(I)

wherein, in Formula (I), each of $R^1$ to $R^4$ independently represents a hydrogen atom or an alkyl group having from 1 to 3 carbon atoms.

<2> The epoxy resin according to <1>, wherein the epoxy compound has a structure in which one of the at least one divalent biphenyl groups is positioned between two of the two or more structures represented by Formula (I).

<3> The epoxy resin according to <1> or <2>, wherein the epoxy compound comprises at least one selected from the group consisting of a structure represented by the following Formulae (II-A) and a structure represented by the following (II-B):

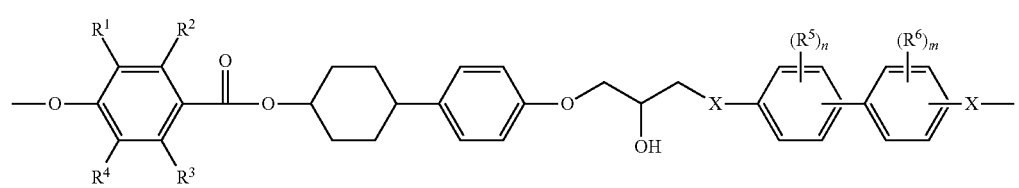

(II-A)

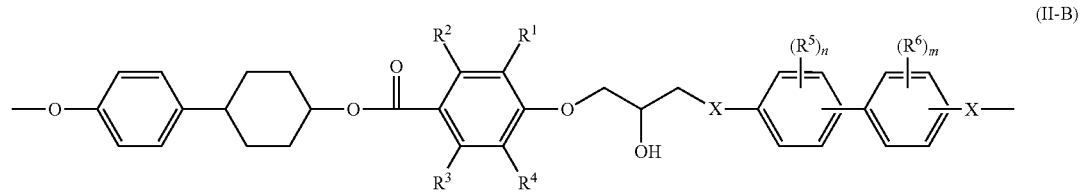

(II-B)

wherein, in Formula (II-A) and Formula (II-B), each of $R^1$ to $R^4$ independently represents a hydrogen atom or an alkyl group having from 1 to 3 carbon atoms, each of $R^5$ and $R^6$ independently represents an alkyl group having from 1 to 8 carbon atoms, each of n and m independently represents an integer from 0 to 4, and each X independently represents —O— or —NH—.

<4> An epoxy resin composition, comprising the epoxy resin according to any one of <1> to <3> and a curing agent.

<5> The epoxy resin composition according to <4>, which is configured to form a smectic structure in a cured state.

<6> An epoxy resin cured product, comprising a cured product of the epoxy resin composition according to <4> or <5>.

<7> A composite material, comprising the epoxy resin cured product according to <6> and a reinforcing material.

Effect of the Invention

According to the invention, an epoxy resin and an epoxy resin composition having excellent handleability are provided. Further, an epoxy resin cured product and a composite material obtained by using the epoxy resin or the epoxy resin composition are provided.

Embodiments for Implementing the Invention

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the specification, the numerical range represented by "from A to B" includes A and B as a maximum value and a minimum value, respectively.

In the specification, when numerical ranges are described in a stepwise manner, the values of the upper or lower limit of each numerical range may be substituted by the values of the upper or lower limit of the other numerical range, or may be substituted by the values described in the Examples.

In the specification, when there are more than one kind of substances corresponding to a component of a composition, the content of the component refers to a total content of the substances, unless otherwise stated.

In the specification, the epoxy compound refers to a compound having an epoxy group in its molecule. The epoxy resin refers to a collective concept of epoxy compounds that are not in a cured state.

<Epoxy Resin>

The epoxy resin of the embodiment includes an epoxy compound, the epoxy compound comprising two or more structures represented by the following Formula (I) and at least one divalent biphenyl group:

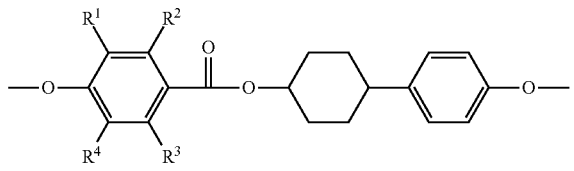

wherein, in Formula (I), each of $R^1$ to $R^4$ independently represents a hydrogen atom or an alkyl group having from 1 to 3 carbon atoms. Hereinafter, the epoxy compound is also referred to as a specific epoxy compound.

In Formula (I), each of $R^1$ to $R^4$ independently is preferably a hydrogen atom or an alkyl group having 1 or 2 carbon atoms, more preferably a hydrogen atom or a methyl group, further preferably a hydrogen atom.

The number of hydrogen atom represented by $R^1$ to $R^4$ is preferably from 2 to 4, more preferably 3 or 4, further preferably 4.

When the epoxy compound has an alkyl group having 1 to 3 carbon atoms as any one of $R^1$ to $R^4$, the alkyl group is preferably at least one of $R^1$ or $R^4$.

Since a specific epoxy compound has a mesogenic structure, the epoxy compound forms a higher-order structure in a cured product obtained by reaction with a curing agent.

The higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of islands, wherein each island corresponds to a higher-order structure. The structural elements of the higher-order structure are generally formed by covalent bonding.

Examples of a higher-order structure formed in a cured state include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity of a cured product.

Whether or not a smectic structure is formed in a cured product obtained by reaction of the epoxy resin and a curing agent can be determined by X-ray diffraction measurement using, for example, an X-ray diffractometer from Rigaku Corporation. When measurement is performed using CuKα1 line under a tube voltage of 40 kV and a tube current of 20 mA, in a range of 2θ=2° to 30°, a cured product having a smectic structure exhibits a diffraction peak in a range of 2θ=2° to 10°.

According to the studies made by the inventors, it is found that an epoxy resin including a specific epoxy compound tends to decrease in viscosity as the temperature is increased and becomes easier to handle, as compared with an epoxy resin described in Patent Document 1 which includes a compound obtained by reacting an epoxy monomer having a mesogenic structure and a divalent phenol compound. Although the reason for the improvement in handleability is not clear, it is presumed that the molecular mobility is increased as a result of an increase in molecular size.

(Specific Epoxy Compound)

The structure of the specific epoxy compound is not particularly limited, as long as it has at least two of a structure represented by Formula (I) and at least one divalent biphenyl group.

Preferably, the specific epoxy compound has a structure in which one divalent biphenyl group is positioned between two of the structure represented by Formula (I). Examples of the divalent biphenyl group include the following structures represented by Formula (A).

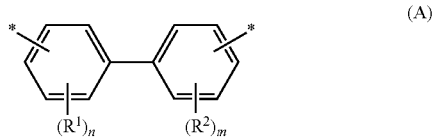

In Formula (A), * represents a bonding position to an adjacent atom. Examples of the adjacent atom include an oxygen atom and a nitrogen atom. Each of $R^1$ and $R^2$ independently represents an alkyl group having from 1 to 8 carbon atoms. Each of n and m independently represents an integer of from 1 to 4.

Each of n and m is preferably independently an integer of from 0 to 2, more preferably 0 or 1, further preferably 0.

The structure represented by Formula (A) is preferably a structure represented by the following Formula (a). A specific epoxy compound having a structure represented by Formula (a) tends to have a straight molecular structure, and is considered to have a high stacking ability of molecules and more likely to form a higher-order structure.

$$*-\underset{(R^1)_n}{\underset{|}{\bigcirc}}-\underset{(R^2)_m}{\underset{|}{\bigcirc}}-* \quad (a)$$

In Formula (a), definitions and preferred examples of *, $R^1$, $R^2$, n and m are the same as the definitions and preferred examples of *, $R^1$, $R^2$, n and m in Formula (A).

The specific epoxy compound may be an epoxy compound having at least one selected from the group consisting of a structure represented by the following Formula (II-A) and a structure represented by the following Formula (II-B).

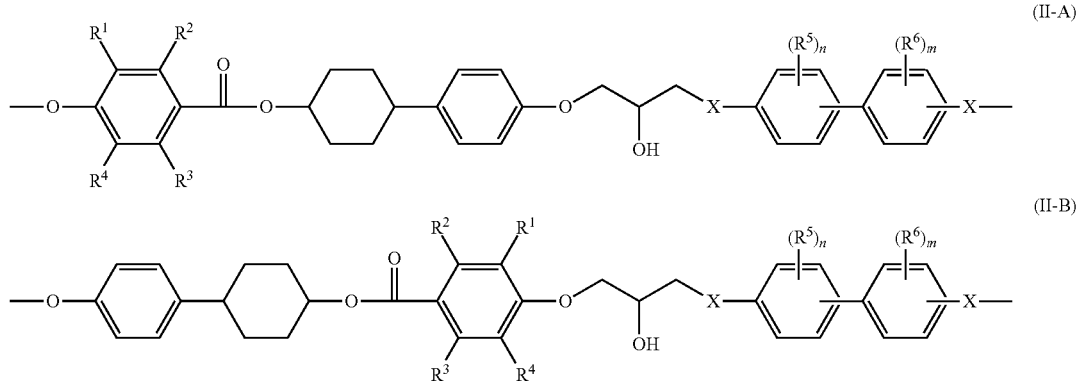

In Formula (II-A) and Formula (II-B), each of $R^1$ to $R^4$ independently represents a hydrogen atom or an alkyl group having from 1 to 3 carbon atoms. Each of $R^5$ and $R^6$ independently represents an alkyl group having from 1 to 8 carbon atoms. Each of n and m independently represents an integer of from 0 to 4. Each of X independently represents —O— or —NH—.

Specific examples and preferred ranges of $R^1$ to $R^4$ in Formula (II-A) and Formula (II-B) are the same as the specific examples and preferred ranges of $R^1$ to $R^4$ in Formula (I).

In Formula (II-A) and Formula (II-B), each of $R^5$ and $R^6$ independently represents an alkyl group having from 1 to 8 carbon atoms, preferably an alkyl group having from 1 to 3 carbon atoms, more preferably a methyl group.

In Formula (II-A) and Formula (II-B), each of n and m independently represents an integer of from 0 to 4, preferably an integer of from 0 to 2, more preferably 0 or 1, further preferably 0. Specifically, the benzene ring having $R^5$ or $R^6$ in Formula (II-A) and Formula (II-B) preferably has from 2 to 4 hydrogen atoms, more preferably 3 or 4 hydrogen atoms, further preferably 4 hydrogen atoms.

From the viewpoint of forming a higher-order structure, the epoxy compound having a structure represented by Formula (II-A) and (II-B) is preferably an epoxy compound having a structure represented by the following Formula (II-a) and (II-b).

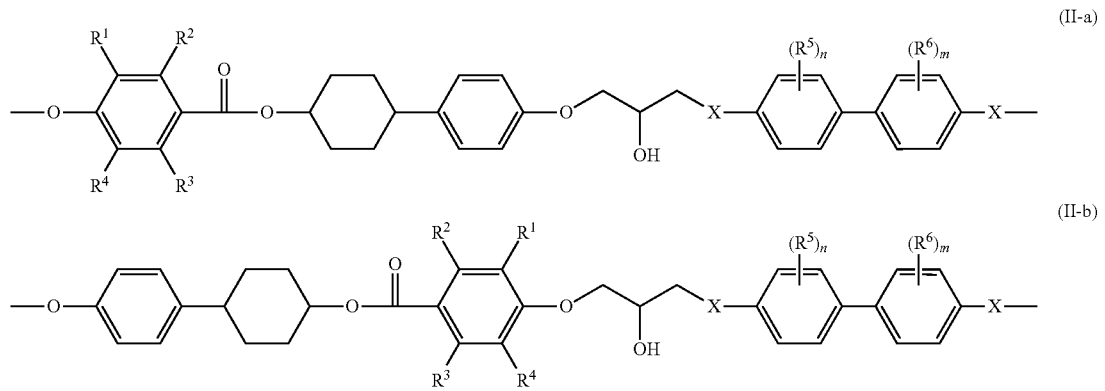

(II-a)

(II-b)

In Formula (II-a) and Formula (II-b), definitions and preferred examples of $R^1$ to $R^6$, n, m and X are the same as the definitions and preferred examples of $R^1$ to $R^6$, n, m and X in Formula (II-A) and (II-B).

The number of the structure represented by Formula (I) in the specific epoxy compound is not particularly limited, as long as it is at least two. From the viewpoint of reducing viscosity, at least a part of the specific epoxy compound is a compound having two of the structure represented by Formula (I) (hereinafter, also referred to as a dimeric compound).

Exemplary structures of the specific epoxy compound as a dimeric compound include at least one selected from the group consisting of the compounds represented by the following Formulae (III-A) to (III-C).

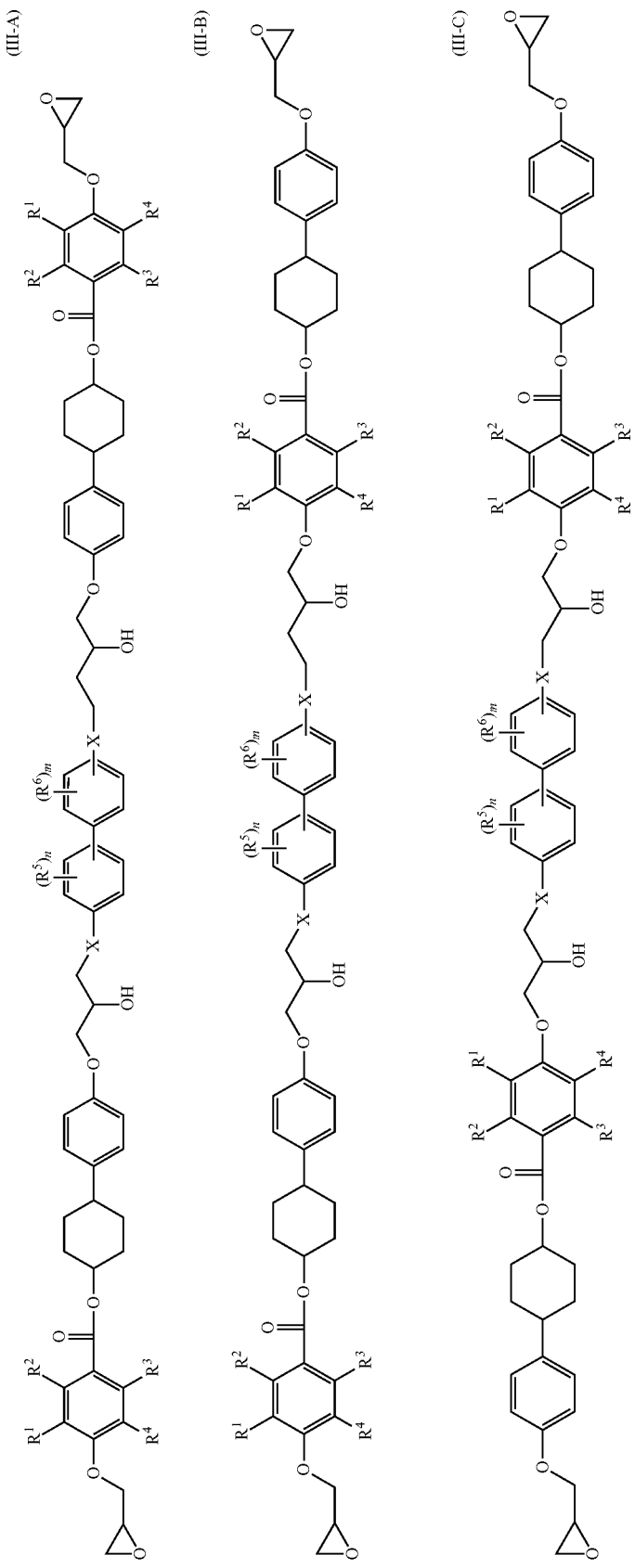

Definitions and preferred examples of $R^1$ to $R^6$, n, m and X are the same as the definitions and preferred examples of $R^1$ to $R^6$, n, m and X in Formula (II-A) and (II-B).

From the viewpoint of forming a higher-order structure, the epoxy compound having a structure represented by Formulae (III-A) to (III-C) is preferably an epoxy compound having a structure represented by the following Formulae (III-a) to (III-c).

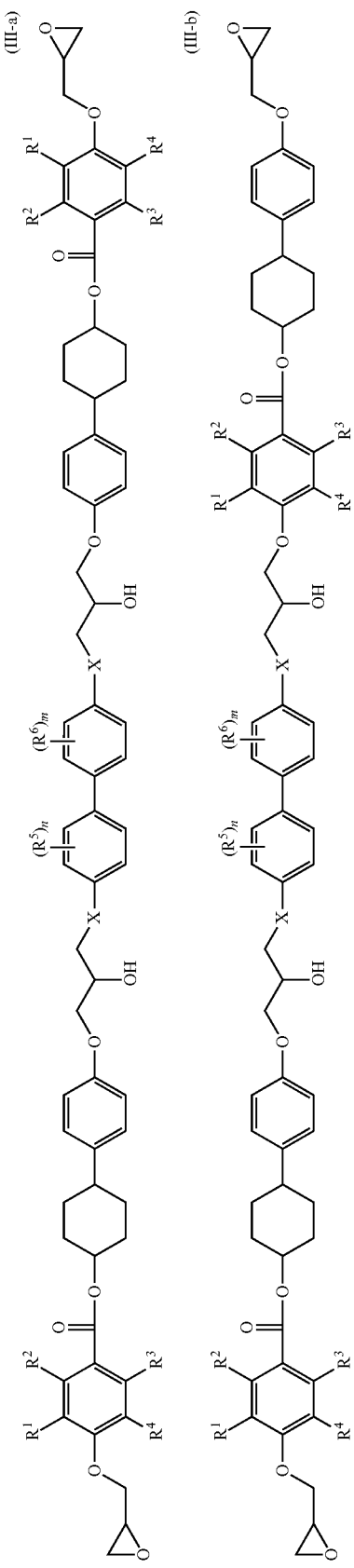

In Formulae (III-a) to (III-c), definitions and preferred examples of $R^1$ to $R^6$, n, m and X are the same as the definitions and preferred examples of $R^1$ to $R^6$, n, m and X in Formulae (III-A) to (III-C).

The method for synthesizing the specific epoxy compound is not particularly limited. For example, the specific epoxy compound may be obtained by allowing an epoxy compound represented by the following Formula (M), hereinafter also referred to as a specific epoxy monomer, to react with a compound having a functional group that is capable of reacting with an epoxy group of the specific epoxy monomer.

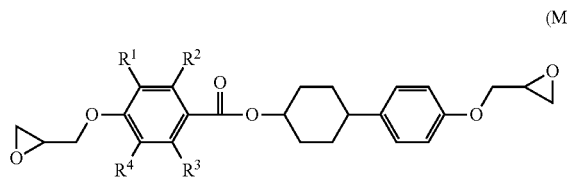

(M)

In Formula (M), each of $R^1$ to $R^4$ independently represents a hydrogen atom or an alkyl group having from 1 to 3 carbon atoms. Each of $R^1$ to $R^4$ are preferably independently a hydrogen atom or an alkyl group having 1 or 2 carbon atoms, more preferably a hydrogen atom or a methyl group, further preferably a hydrogen atom. The number of hydrogen atom represented by $R^1$ to $R^4$ is preferably from 2 to 4, more preferably 3 or 4, further preferably 4.

Examples of the compound represented by Formula (M) include compounds described in Japanese Patent Application Laid-Open No. 2011-74366, specifically, at least one selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate.

The method of synthesizing the specific epoxy compound, by reacting a specific epoxy monomer and a compound having a functional group that is capable of reacting with an epoxy group of the specific epoxy monomer, is not particularly limited. For example, a specific epoxy compound can be synthesized by dissolving, in a solvent, a specific epoxy monomer and a compound having a functional group that is capable of reacting with an epoxy group of the specific epoxy monomer, and optionally a reaction catalyst, and stirring the same while heating.

Alternatively, for example, a specific epoxy compound may be synthesized by mixing, without a solvent, a specific epoxy monomer and a compound having a functional group that is capable of reacting with an epoxy group of the specific epoxy monomer, and optionally a reaction catalyst, and stirring the same while heating.

The solvent is not particularly limited, as long as it can dissolve a specific epoxy monomer and a compound having a functional group that is capable of reacting with an epoxy group of the specific epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve and propyleneglycol monopropyl ether.

The amount of the solvent is not particularly limited, as long as a specific epoxy monomer and a compound having a functional group that is capable of reacting with an epoxy group of the specific epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that is capable of reacting with an epoxy group of the specific epoxy monomer is not particularly limited. From the viewpoint of forming a smectic structure in a cured product, the compound is preferably at least one selected from the group consisting of a dihydroxy biphenyl compound, having a structure in which each of the two benzene rings in the biphenyl group has a hydroxy group, and a diaminobiphenyl compound, having a structure in which each of the two benzene rings in the biphenyl group has an amino group, respectively (hereinafter, also referred to a specific biphenyl compound).

By causing reaction of an epoxy group of the specific epoxy monomer with a hydroxy group or an amino group of the specific biphenyl compound, a specific epoxy compound having at least one selected from a structure represented by Formula (II-A) and Formula (II-B) can be synthesized.

Examples of the dihydroxybiphenyl compound include 3,3'-dihydroxybiphenyl, 3,4'-dihydroxybiphenyl, 4,4'-dihydroxybiphenyl, and derivatives of these compounds.

Examples of the diaminobiphenyl compound include 3,3'-diaminobiphenyl, 3,4'-diaminobiphenyl, 4,4'-diaminobiphenyl, and derivatives of these compounds.

Derivatives of the specific biphenyl compound include a specific biphenyl compound having a substitute, such as an alkyl group of from 1 to 8 carbon atoms, on the benzene ring. A single kind of the specific biphenyl compound may be used alone, or two or more kinds may be used in combination.

From the viewpoint of forming a smectic structure in a cured product of the epoxy resin, the divalent biphenyl compound is preferably 4,4'-biphenol or 4,4'-diaminobiphenyl. Since the compounds have the hydroxy groups or the amino groups at a para position with respect to each other, a specific epoxy compound obtained by reacting the compound with a specific epoxy monomer tends to have a straight structure. Therefore, a smectic structure tends to be formed due to a high degree of stacking of the molecules.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of heat resistance of a cured product, the reaction catalyst is preferably an organic phosphorous compound.

Examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl) phosphine, tris(dialkoxyphenyl)phosphine, tris (trialkoxyphenyl)phosphine, tris(tetraalkoxyphenyl) phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the specific epoxy monomer and the compound having a functional group that is capable of reacting with an epoxy group of the specific epoxy monomer.

In a case of synthesizing a specific epoxy compound by using a specific epoxy monomer, the total of the specific epoxy monomer may react to form a specific epoxy compound, or the specific epoxy monomer may partly remain in an unreacted state.

A specific epoxy compound can be synthesized by using a reaction container, such as a flask in a small scale or a reaction cauldron in a large scale. A specific example of the synthesis method is described below.

A specific epoxy monomer is placed in a reaction container and a solvent is added as necessary, and the specific epoxy monomer is dissolved by heating the reaction container to a reaction temperature with an oil bath or a heating medium. Then, a compound having a functional group that is capable of reacting with an epoxy group of the specific epoxy monomer is added thereto. After dissolving the compound in the solvent, a reaction catalyst is added as necessary, thereby starting the reaction. Subsequently, the solvent is removed under reduced pressure as necessary, and a specific epoxy compound is obtained.

The reaction temperature is not particularly limited, as long as the reaction of an epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the specific epoxy monomer and the compound having a functional group that is capable of reacting with an epoxy group of the specific epoxy monomer is not particularly limited. For example, the ratio may be adjusted to satisfy a ratio of the number of equivalent of epoxy group (A) to the ratio of the number of equivalent of the functional group that is capable of reacting with an epoxy group (B), represented by A:B, of from 10:10 to 10:0.01. From the viewpoint of fracture toughness and heat resistance of a cured product, the value of A:B is preferably from 10:5 to 10:0.1.

From the viewpoint of handleability of the epoxy resin, the range of A:B is preferably from 10:1.6 to 10:3.0, more preferably from 10:1.8 to 10:2.9, further preferably from 10:2.0 to 10:2.8.

The structure of the specific epoxy compound can be determined by, for example, matching a molecular weight of the specific epoxy compound, which is presumed to be obtained by the reaction of the specific epoxy monomer and the compound having a functional group that is capable of reacting with an epoxy group of the specific epoxy monomer, with a molecular weight of a target compound obtained by liquid chromatography performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/l aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

From the viewpoint of handleability, the content of the specific epoxy compound in the total epoxy resin is preferably 40% by mass or more, more preferably 45% by mass or more, further preferably 50% by mass or more. From the viewpoint of heat resistance, the content of the specific epoxy compound in the total epoxy resin is preferably 80% by mass or less, more preferably 75% by mass or less, further preferably 70% by mass or less.

When the epoxy resin includes a dimeric compound as a specific epoxy compound, the content thereof is not particularly limited. From the viewpoint of heandleability, the content of the dimeric compound in the total epoxy resin is preferably 10% by mass or more, more preferably 15% by mass or more, further preferably 20% by mass or more. From the viewpoint of heat resistance, the content of the dimeric compound in the total epoxy resin is preferably 60% by mass or less, more preferably 55% by mas or less, further preferably 50% by mass or less.

When the epoxy resin includes a specific epoxy monomer, the content thereof is not particularly limited. From the viewpoint of heat resistance, the content of the specific epoxy monomer in the total epoxy resin is preferably 30% by mass or more, more preferably 35% by mass or more, further preferably 40% by mass or more. From the viewpoint of handleability, the content of the specific epoxy monomer in the total epoxy resin is preferably 90% by mass or less, more preferably 80% by mass or less, further preferably 70% by mass or less, yet further preferably 50% by mass or less.

The weight average molecular weight (Mw) of the epoxy resin is not particularly limited. From the viewpoint of reducing viscosity, the weight average molecular weight (Mw) of the epoxy resin is preferably selected from a range of from 800 to 1300.

In the embodiment, the number average molecular weight (Mn) and the weight average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation)

The epoxy equivalent of the epoxy resin is not particularly limited. From the viewpoint of fluidity of the epoxy resin and thermal conductivity of the cured product, the epoxy equivalent is preferably from 245 g/eq to 360 g/eq, more preferably from 250 g/eq to 355 g/eq, further preferably from 260 g/eq to 350 g/eq. When the epoxy equivalent of the epoxy resin is 245 g/eq or more, crystallinity of the epoxy resin is not too high and a favorable fluidity of the epoxy resin tends to be maintained. When the epoxy equivalent of the epoxy resin is 360 g/eq or less, a cured product tends to exhibit a favorable thermal conductivity as a result of maintaining sufficient crosslink density of the epoxy resin. In the embodiment, the epoxy equivalent is measured by perchloric acid titration.

<Epoxy Resin Composition>

The epoxy resin composition of the embodiment includes the epoxy resin of the embodiment as described above, and a curing agent.

(Curing Agent)

The curing agent is not particularly limited, as long as it is capable of causing a curing reaction with the epoxy resin included in the epoxy resin composition. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, the curing agent is preferably an amine curing agent or a phenol curing agent, more preferably an amine curing agent, further preferably a compound having two or more amino groups that are directly bound to a benzene ring.

Specific examples of the amine curing agent include 3,3'-diamnodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably selected from 4,4'-diaminodiphenylsulfone, 1,3-diaminobenzene, 1,4-diaminobenzene, 4,4'-diaminobenzanilide, 1,5-diaminonaphthalene, 4,4'-diaminodiphenylmethane and trimethylene-bis-4-aminobenzoate. From the viewpoint of obtaining a cured product with a high Tg, the curing agent is more preferably 4,4'-diaminodiphenylsulfone and 4,4'-diaminobenzanilide.

Specific examples of the phenol curing agent include a low-molecular phenol compound and a phenol novolac resin obtained by linking low-molecular phenol compounds with a methylene group or the like. Specific examples of the low-molecular phenol compound include a monofunctional phenol compound such as phenol, o-cresol, m-cresol and p-cresol, a bifunctional phenol compound such as catechol, resorcinol and hydroquinone, and trifunctional phenol compound such as 1,2,4-trihydroxybenzene and 1,3,5-trihydroxybenzene.

The content of the curing agent in the epoxy resin composition is not particularly limited. From the viewpoint of efficiency of curing reaction, the content of the curing agent preferably satisfies a ratio of the active hydrogen equivalent (amine equivalent) of the curing agent to the epoxy equivalent (amine/epoxy) of from 0.3 to 3.0, more preferably from 0.5 to 2.0.

(Other Components)

The epoxy resin composition may include components other than the epoxy resin and the curing agent. For example, the epoxy resin composition may include a reaction catalyst, a filler or the like. Specific examples of the reaction catalyst include the compounds as described above as a reaction catalyst used for the synthesis of the specific epoxy compound.

(Use Application)

The use application of the epoxy resin composition is not particularly limited. The epoxy resin composition is suitably applied for a process in which low viscosity and high fluidity are required. For example, the epoxy resin composition may be used for a process of producing FRPs, in which fibers are impregnated with an epoxy resin composition while heating, or a process of producing a sheet-like product in which an epoxy resin composition is spread with a squeegee or the like while heating.

The epoxy resin composition is also suitably applied for a process in which addition of a solvent for adjusting viscosity is desired to be omitted or reduced, in order to suppress formation of voids in a cured product.

<Epoxy Resin Cured Product and Composite Material>

The epoxy resin cured product of the embodiment is obtained by curing the epoxy resin composition of the embodiment. The composite material includes the epoxy resin cured product of the embodiment and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone or may include two or more kinds in combination.

EXAMPLES

In the following, the invention is explained by referring to the Examples. However, the invention is not limited to these Examples.

Example 1

To a 500-mL three-necked flask, 50 g of an epoxy monomer (4-{4-(2,3-epoxypropoxy)phenyl}cyclohexyl=4-(2,3-epoxypropoxy)benzoate, following structure) were placed, and 80 g of propylene glycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring. After confirming that the epoxy monomer was dissolved and the solution became clear, 4,4-dihydroxybiphenyl was added such that the equivalent ratio of epoxy group (A) of the epoxy monomer to hydroxy group of 4,4-dihydroxybiphenyl (A:B) was 10:1.6. Then, 0.5 g of triphenylphoshine as a reaction catalyst were added and further heated at 120° C. After continuing the heating for 3 hours, propylene glycol monomethyl ether was evaporated under reduced pressure, and the residue was cooled to room temperature (25° C.).

Epoxy resin 1, in which a part of the epoxy monomer formed a multimer by reacting with 4,4'-dihydroxybiphenyl, was thus obtained.

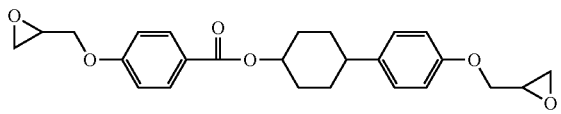 [SMILES: O=C(OC1CCC(c2ccc(OCC3CO3)cc2)CC1)c1ccc(OCC2CO2)cc1]

Subsequently, 50 g of Epoxy resin 1 and 9.4 g of 4,4'-diaminodiphenylsulfone as a curing agent were placed in a stainless steel dish, and heated on a hot plate to 180° C. After the resin in the dish was melted, it was heated at 180° C. for 1 hour. After cooling to room temperature (25° C.), the resin was taken out from the dish and heated in an oven at 230° C. for 1 hour to complete the curing, thereby obtaining an epoxy resin cured product.

A sample for evaluating fracture toughness having a size of 3.75 mm×7.5 mm×33 mm and a sample for evaluating glass transition temperature having a size of 2 mm×0.5 mm×40 mm were prepared from the epoxy resin cured product, respectively.

Example 2

An epoxy resin, in which a part of the epoxy monomer formed a multimer by reacting with 4,4'-dihydroxybiphenyl, was obtained in the same manner as Example 1, except that 4,4'-dihydroxybiphenyl was added such that the equivalent ratio of epoxy group (A) of the epoxy monomer to hydroxy group of 4,4'-dihydroxybiphenyl (A:B) was 10:2.0. Samples were prepared from the epoxy resin cured product in the same manner as Example 1.

Example 3

An epoxy resin, in which a part of the epoxy monomer formed a multimer by reacting with 4,4'-dihydroxybiphenyl, was obtained in the same manner as Example 1, except that 4,4'-dihydroxybiphenyl was added such that the equivalent ratio of epoxy group (A) of the epoxy monomer to hydroxy group of 4,4'-dihydroxybiphenyl (A:B) was 10:2.5. Samples were prepared from the epoxy resin cured product in the same manner as Example 1.

Example 4

An epoxy resin, in which a part of the epoxy monomer formed a multimer by reacting with 4,4'-dihydroxybiphenyl, was obtained in the same manner as Example 1, except that 4,4'-dihydroxybiphenyl was added such that the equivalent ratio of epoxy group (A) of the epoxy monomer to hydroxy group of 4,4'-dihydroxybiphenyl (A:B) was 10:2.8. Samples were prepared from the epoxy resin cured product in the same manner as Example 1.

Example 5

An epoxy resin, in which a part of the epoxy monomer formed a multimer by reacting with 4,4'-dihydroxybiphenyl, was obtained in the same manner as Example 1, except that 4,4'-dihydroxybiphenyl was added such that the equivalent ratio of epoxy group (A) of the epoxy monomer to hydroxy group of 4,4'-dihydroxybiphenyl (A:B) was 10:3.0. Samples were prepared from the epoxy resin cured product in the same manner as Example 1.

Comparative Example 1

An epoxy resin, in which a part of the epoxy monomer formed a multimer by reacting with hydroquinone, was obtained in the same manner as Example 1, except that hydroquinone was added instead of 4,4'-dihydroxybiphenyl such that the equivalent ratio of epoxy group (A) of the epoxy monomer to hydroxy group of hydroquinone (A:B) was 10:1.6. Samples were prepared from the epoxy resin cured product in the same manner as Example 1.

Comparative Example 2

An epoxy resin cured product was obtained in the same manner as Example 1, except that the epoxy monomer was used as the epoxy resin without performing a process of reacting the epoxy monomer with 4,4-dihydroxylbiphenyl. Samples were prepared from the epoxy resin in the same manner as Example 1.

<Evaluation of Spreadability>

The spreadability of the epoxy resin was evaluated by the following process. A stainless steel plate was placed on a hot plate heated at 150° C., and a PET film was placed and fixed on the stainless steel plate. The epoxy resin in several grams was placed on the PET film and allowed to melt. The temperature of the hot plate was lowered to 100° C., and maintained at this temperature for approximately 5 minutes. The epoxy resin was spread on the PET film using an applicator heated at 100° C. with a gap of 100 μm. The spreadability of the epoxy resin was evaluated by the following criteria. The results are shown in Table 1.

A: The epoxy resin maintains fluidity, and is spreadable for 10 cm with a uniform appearance.

B: The epoxy resin maintains fluidity, and is spreadable for 10 cm with a partly scratchy appearance.

C: The epoxy resin clumps and cannot spread uniformly, or the epoxy resin is too viscous to spread for 10 cm or cannot spread at all.

D: The epoxy resin does not melt uniformly.

<Evaluation of Viscosity Behavior>

The viscosity behavior of the epoxy resin was evaluated by measuring a dynamic shear viscosity.

The dynamic shear viscosity (Pa·s) was measured according to JIS K 7244-10:2005, using a rheometer (MCR-301, Anton-Paar) with a vibrational mode. The measurement was performed by using a parallel plate with a diameter of 12 mm at s frequency of 1 Hz, a gap of 0.2 mm and a distortion of 2%.

Prior to the measurement, the epoxy resin was melted at 150° C. for at least 3 minutes. Then, a process of decreasing the temperature from 150° C. to 30° C. at a rate of 2° C./min and a process of elevating the temperature from 30° C. to 150° C. at a rate of 2° C./min were performed in this order. The dynamic shear viscosity was measured at 70° C. during the process of elevating the temperature. The results are shown in Table 1.

<Evaluation of Heat Resistance>

The glass temperature (Tg, ° C.) of the samples was measured as an indicator for heat resistance. The measurement was performed by a dynamic viscoelasticity measurement at a tensile mode, at a frequency of 10 Hz, s rate of temperature elevation of 5° C./min and a distortion of 0.1%. The measurement was performed by using RSA-G2 (TA Instruments). The temperature corresponding to the maximum value of tan δ in a temperature-tan δ chart was determined as a glass transition temperature. The results are shown in Table 1.

<Evaluation of Fracture Toughness>

The fracture toughness (MPa·m$^{1/2}$) of the samples was measured by a three-point bending test according to ASTM D5045 with a tester (Instron 5948 from Instron). The results are shown in Table 1.

<X-Ray Diffraction Measurement>

The epoxy resin cured product was subjected to X-ray diffraction measurement, by using a X-ray diffractometer (Rigaku Corporation), in order to confirm whether or not a smectic structure was formed. The measurement was conducted by using CuKα1 line, under a tube voltage of 50 kV, a tube current of 300 mA, a scan rate of 1°/min, in a measurement range of 2θ=2° to 30°. The results are shown in Table 1.

Yes: a diffraction peak appears in a range of 2θ=2° to 10°, indicating that a smectic structure is formed.

No: a diffraction peak does not appear in a range of 2θ=2° to 10°, indicating that a smectic structure is not formed.

precipitation at 70° C. during the process of elevating the temperature, and the spreadability was inferior to the Examples.

The epoxy resin of Comparative Example 2, in which the epoxy monomer was used as the epoxy resin, did not melt by heating at 150° C. for 3 minutes and the viscosity was not measured. In addition, the spreadability was inferior to the Examples.

In view of the above, it is found that the epoxy resin of the embodiment exhibits excellent spreadability.

Further, the epoxy resin cured products of Examples 1 to 5 exhibited an excellent fracture toughness and a high glass transition temperature, respectively.

The invention claimed is:

1. An epoxy resin comprising an epoxy compound present in an amount of up to 50% by mass of a total of the epoxy resin, the epoxy compound comprising two structures represented by the following Formula (I) and at least one divalent biphenyl group:

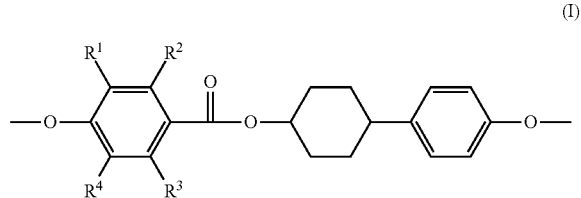

(I)

wherein, in Formula (I), each of $R^1$ to $R^4$ independently represents a hydrogen atom or an alkyl group having from 1 to 3 carbon atoms.

TABLE 1

| | A:B | Spreadability | Viscosity [Pa · s] | Tg [° C.] | Fracture toughness [MPa · m$^{1/2}$] | Smectic structure |
|---|---|---|---|---|---|---|
| Example 1 | 10:1.6 | B | 61 | 250 | 1.3 | Yes |
| Example 2 | 10:2.0 | A | 46 | 245 | 1.5 | Yes |
| Example 3 | 10:2.5 | A | 34 | 226 | 1.7 | Yes |
| Example 4 | 10:2.8 | A | 52 | 221 | 1.7 | Yes |
| Example 5 | 10:3.0 | B | 71 | 212 | 1.8 | Yes |
| Comparative Example 1 | 10:1.6 | C | Crystal precipitation | 250 | 1.0 | Yes |
| Comparative Example 2 | 10:0 | D | Not melted | 293 | 0.8 | Yes |

As shown in Table 1, the epoxy resin of the Examples, in which a part of the epoxy monomer was reacted with 4,4'-dihydroxybiphenyl, had a low viscosity at 70° C. during the process of elevating the temperature, and exhibited excellent spreadability.

The epoxy resin of Comparative Example 1, in which a part of the epoxy monomer was reacted with hydroquinone, exhibited a high viscosity (more than 10$^6$ Pa·s) with crystal 2. The epoxy resin according to claim 1, wherein the epoxy compound has a structure in which one of the at least one divalent biphenyl groups is positioned between two structures represented by Formula (I).

3. The epoxy resin according to claim 1, wherein the epoxy compound comprises at least one selected from the group consisting of a structure represented by the following Formulae (II-A) and a structure represented by the following (II-B):

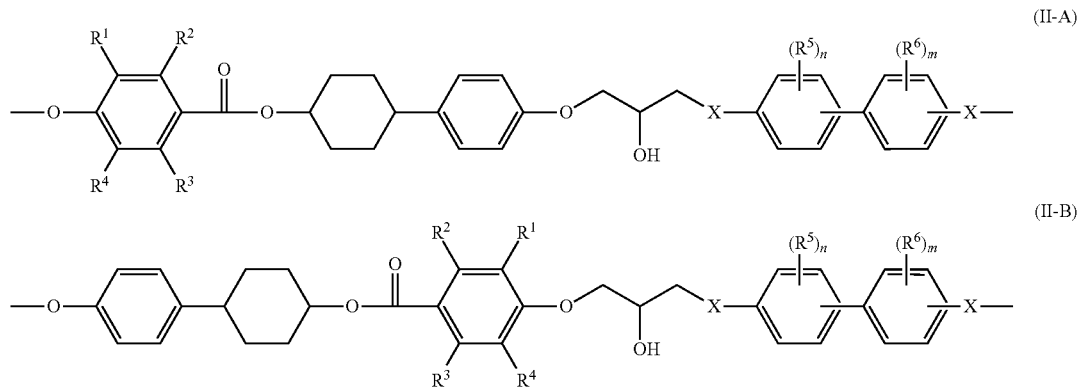

wherein, in Formula (II-A) and Formula (II-B), each of $R^1$ to $R^4$ independently represents a hydrogen atom or an alkyl group having from 1 to 3 carbon atoms, each of $R^5$ and $R^6$ independently represents an alkyl group having from 1 to 8 carbon atoms, each of n and m independently represents an integer from 0 to 4, and each X independently represents —O— or —NH—.

4. The epoxy resin according to claim 1, wherein the epoxy compound is present in an amount of 10% to 50% by mass of a total of the epoxy resin.

5. An epoxy resin composition, comprising the epoxy resin according to claim 1 and a curing agent.

6. The epoxy resin composition according to claim 5, which is configured to form a smectic structure in a cured state.

7. An epoxy resin cured product, comprising a cured product of the epoxy resin composition according to claim 5.

8. A composite material, comprising the epoxy resin cured product according to claim 7 and a reinforcing material.

* * * * *